United States Patent [19]
Wooden

[11] 3,709,633
[45] Jan. 9, 1973

[54] REINFORCED PLASTIC FAN HUB
[75] Inventor: John A. Wooden, Indianapolis, Ind.
[73] Assignee: Brookside Corporation, McCordsville, Ind.
[22] Filed: Oct. 7, 1971
[21] Appl. No.: 187,347

Related U.S. Application Data
[63] Continuation-in-part of Ser. No. 118,379, Feb. 24, 1971.

[52] U.S. Cl. ................416/134, 287/52.08, 416/244
[51] Int. Cl. ................................................F04d 29/20
[58] Field of Search ...............416/134, 244; 64/27 R; 287/52.08

[56] References Cited

UNITED STATES PATENTS 1,309,675   7/1919   Young et al. .....................287/52.08
2,335,394  11/1943   Devore et al. .......................416/241

Primary Examiner—Everette A. Powell, Jr.
Attorney—Maurice A. Weikart et al.

[57] ABSTRACT

Disclosed is a hub formed of plastic which carries a fan spider, blower wheel or other driven member and has a central bore to accommodate a motor shaft. A cavity is formed in the hub and accommodates a resilient leaf is is threaded on a shaft-engaging set screw extending radially into the central bore. Tightening the set screw on the shaft distorts the resilient member and the internal restoring force thereby exerted by the resilient member holds the hub locked on the shaft despite the normal cold-flow or creep of the hub material. A reinforcing steel band in the hub extends from the areas of engagement of the distorted resilient member with the cavity walls to and around a portion of the central bore surface.

4 Claims, 3 Drawing Figures

PATENTED JAN 9 1973

3,709,633

INVENTOR
JOHN A. WOODEN
BY
Woodard, Weikart, Emhardt & Naughton
ATTORNEYS

REINFORCED PLASTIC FAN HUB

BACKGROUND OF THE INVENTION

This application is a continuation-in-part of my copending U.S. patent application Ser. No. 118,379, filed Feb. 24, 1971, titled "Plastic Fan Hub."

In order to minimize the cost of fabrication and assembly of air moving elements such as fans and blower wheels, the use of molded plastic in forming the fan spider or blower wheel, the bladed element, has greatly increased. It is desirable that such plastic fan elements be supported on plastic hubs to facilitate bonding of the fan element and hub, to maintain the light overall weight of the complete assembly and to retain the cost advantage of molded plastic components over metal hubs. Plastic hubs for locking fans or blower wheels on motor shafts have, however, encountered the difficulty that the plastic material from which the hub is molded tends to cold-flow or creep when under prolonged stress and the fan hubs, as a result, eventually loosen on the shaft and failure or noisy operation of the fan or blower assembly results.

The hub embodying the concept of the present invention utilizes a resilient member whose restoring force, when deformed by tightening a set screw against the motor shaft accommodating the hub, serves to compensate for any weakening of the hub-to-shaft locking force caused by creep of the material from which the plastic hub is molded. The hub, and hence the air moving element carried by it or molded integrally with it, can be loosened and easily removed from the shaft in the field for servicing and repair of the air moving element or to provide access to associated equipment. The construction also reduces considerably the variation in the actual thrust of the set screw against the shaft and the consequent variation in holding power. Set screws are normally set by the assembler to a certain pre-determined torque. Variations in threads, finishes, and lubricants can actually cause a many-fold variation of the amount of thrust caused by a set or predetermined torque. This construction minimizes this problem because the physical flattening of the resilient member will give the assembler a definite, easily visible and felt reference or limit point, resulting in less thrust force variation. Since this construction minimizes the variation in thrust, less thrust and force need be applied, initially, to assure meeting a predetermined minimum requirement in holding power. This, in turn, reduces the stress and deflection in the plastic part.

The structure of the present invention differs from that of my above-mentioned copending patent application (both structures incorporating the advantages set out above) in that the presently described structure incorporates a reinforcing band or strip, preferably of steel, which absorbs the major portion of the reactive force generated when the resilient member is deformed by tightening of the set screw, the effect being to substantially reduce the plastic creep or cold flow of the hub material under a given loading.

DESCRIPTION OF THE PREFERRED EMBODIMENT

Figure 1:
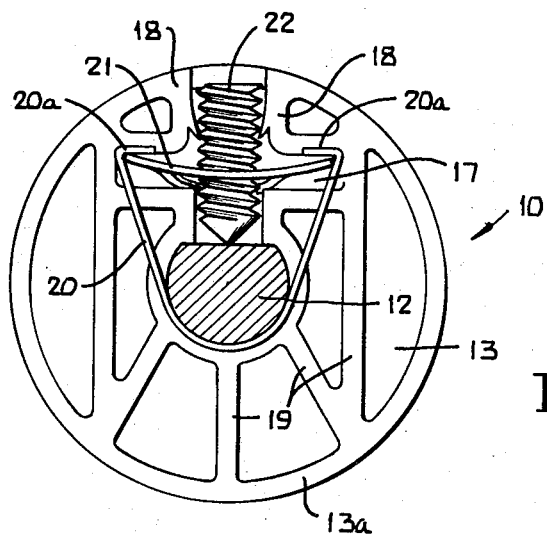
FIG. 1 is an end view of a hub embodying the present invention and shown in place upon a motor shaft.
Figure 2:
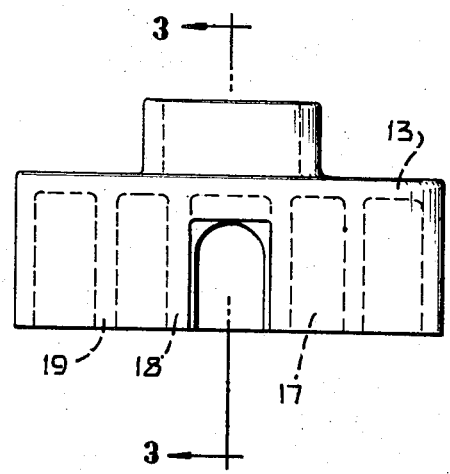
FIG. 2 is a top plan view of the hub shown in FIG. 1 but with the set screw and resilient element omitted.

Referring to the drawings, a plastic hub, indicated generally at 10 is molded or otherwise formed to provide a central bore 11 (FIG. 3) having a truncated circular configuration, as will be evident from FIG. 1, and which is adapted to accommodate a shaft 12 which may be a conventional motor shaft.

Figure 3:
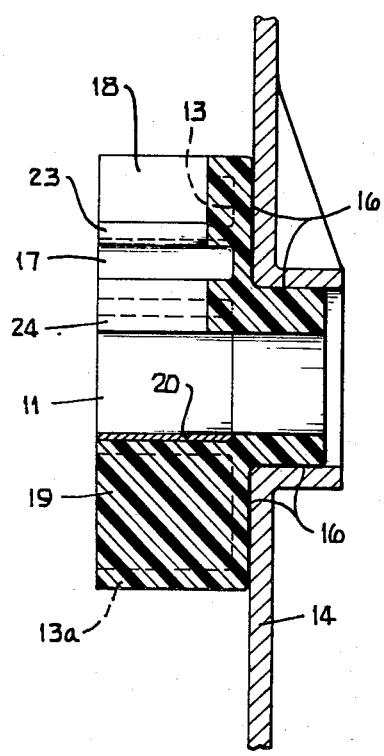
FIG. 3 is a sectional view taken generally along the line 3—3 of FIG. 2, with a fan spider in place on the hub, the fan spider being shown fragmentarily only.

Intermediate its ends, the hub 10 is provided with a radially extending flange 13 as may be seen in FIG. 3. The portion of the hub body adjacent the flange 13 accommodates a driven element such as a fan spider or the end plate of a centrifical blower wheel fragmentarily indicated at 14. The fan element 14 may be rigidly attached at the engaging surfaces 16 to the hub by solvent or adhesive bonding, or by any other suitable means.

The hub body is provided with a generally rectangular cavity 17 which extends in depth parallel to the longitudinal axis of the central bore in the hub and in width extends transverse to the longitudinal axis of the bore. Ribs 18 extend from the outer surface of the cavity wall to the flange 13, and interconnected gussets 19 also extend across the flange face to the peripheral, axial rim 13a of the flange 13.

As will be particularly evident in FIG. 3, the cavity 17 is open at one end and accommodates a resilient element 21 (FIG. 1) which has a central aperture with portions of the resilient element struck downwardly and given a contour so as to receive the threaded circumference of a set screw 22. The set screw 22 extends through registering apertures 23 and 24 in the upper and lower walls of the cavity 17. In unstressed, normal condition the resilient member 21 has a dished or concavo-convex configuration as shown in FIG. 1. Rigidly secured in the hub body is a generally U-shaped, reinforcing strip or band 20 (FIG. 1). The band 20 is preferably formed of steel and of the order of 0.025 inches in thickness. It has a width approximately equal to the width of resilient element 21, and has tip portions 20a imbedded in the upper cavity wall. It extends through the adjacent hub and gusset portions and extends around a portion of the cylindrical central bore 11, this portion being diametrically opposite the set screw 22. The band 20 is preferably joined to the hub by molding it in the hub when the hub is formed. The tip portions 20a of the reinforcing band 20 are engaged by the end portions of the resilient element 21.

In operation, the fully assembled hub, carrying an air moving element (not shown in FIG. 1) may be slipped upon a motor shaft 12 and the set screw 22 tightened against the flat segment of the shaft. Further turning of the set screw serves to move the central portion of the resilient member 21 upwardly as viewed in FIG. 1, flattening the resilient member against the upper wall of the cavity 17 and storing energy in the deformed or flattened resilient member. The restoring force in the distorted resilient member serves to urge the set screw 22 downwardly against the shaft 12 and is sufficient to maintain a strong locking pressure by the set screw against the shaft despite normal creep or cold-flow of the material of the hub which would otherwise serve to decrease the pressure exerted by the set screw on the shaft. The force stored in the deformed resilient member 21 thus serves to compensate for creep of the material of the plastic hub and maintains the hub locked on the shaft.

The primary physical difference in the structure above described and that disclosed in the aforementioned copending patent application is the presence of the reinforcing band or strip 20. This band fuctions to absorb the major portion of the reactive force exerted on the hub when the resilient element 21 is flattened. The creep, or cold flow, of the plastic hub, under a given load, is thus decreased, but the addition of this strip to the hub represents only a very small added cost increment for the hub assembly.

It will be noted that the hub of the present invention utilizes relatively simple and readily available components such as the set screw and resilient member. Further, it will be understood, that while a fan or other driven element is described being attached to the hub at surfaces 16, the hub might be integrally molded with any chosen form of driven element.

I claim:

1. A plastic hub for supporting a driven element such as a fan, blower wheel or the like on a drive shaft, said hub comprising a body having a central bore therethrough adapted to receive a drive shaft, said body being formed to provide a cavity extending in depth parallel to the longitudinal axis of said central bore and extending in width transverse to the longitudinal axis of said central bore, a set screw extending radially from said central bore and through said cavity, and a resilient member threaded on said set screw and disposed within said cavity, said resilient member having a dished configuration adapted to be distorted into a flattened configuration by engagement with a wall of said cavity as the inner end of said set screw is moved to locking engagement with a shaft accommodated within said central bore, the restoring force exerted by the distorted resilient member serving to maintain the locking engagement of said set screw with the bore-accommodated shaft, and a generally U-shaped reinforcing band having its end portions disposed on said cavity wall and engaged by said resilient member, the intermediate portion of said band extending around a portion of said central bore diametrically opposite said set screw.

2. A plastic hub as claimed in claim 1 in which said intermediate portion of said band extends in overlying relation to said portion of the central bore surface opposite said set screw and forming a liner for said central bore portion.

3. A plastic hub as claimed in claim 1 in which said reinforcing band is formed of steel.

4. A plastic hub as claimed in claim 3 in which said reinforcing steel band has a gage thickness of the order of 0.025 inches.

* * * * *